United States Patent [19]

Dressing et al.

[11] Patent Number: 4,797,831
[45] Date of Patent: Jan. 10, 1989

[54] APPARATUS FOR SYNCHRONIZING CYLINDER POSITION IN A MULTIPLE CYLINDER HYDRAULIC PRESS BRAKE

[75] Inventors: Paul A. Dressing, Cincinnati, Ohio; John L. Macdonald, Aurora, Ind.

[73] Assignee: Cincinnati Incorporated, Cincinnati, Ohio

[21] Appl. No.: 932,107

[22] Filed: Nov. 18, 1986

[51] Int. Cl.$^4$ .................... G06F 15/46; B21D 5/02
[52] U.S. Cl. .................... 364/474.07; 72/21; 72/389; 72/702; 364/476
[58] Field of Search ............... 364/475, 476, 474, 142; 72/8, 21, 22, 389, 702

[56] References Cited

U.S. PATENT DOCUMENTS

| | | | |
|---|---|---|---|
| 4,112,493 | 9/1978 | Roch et al. | 364/476 |
| 4,148,203 | 4/1979 | Farazandeh et al. | 72/21 |
| 4,408,471 | 10/1983 | Gossard et al. | 364/476 X |
| 4,511,976 | 4/1985 | Graf | 72/21 X |
| 4,640,113 | 2/1987 | Dieperink et al. | 72/21 |

*Primary Examiner*—Joseph Ruggiero
*Attorney, Agent, or Firm*—Frost & Jacobs

[57] ABSTRACT

An electronic control system for operating the hydraulic cylinders associated with a press brake wherein independent control of each of the hydraulic cylinders is achieved to insure that the cylinders track against a fixed reference to insure more accurate forming of the workpiece. The cylinder tracking is under computer control which also establishes a creep speed slower than the normal forming speed near the point of ram reversal. A plurality of press brake may be operated simultaneously from the same tracking reference.

22 Claims, 4 Drawing Sheets

4,797,831

APPARATUS FOR SYNCHRONIZING CYLINDER POSITION IN A MULTIPLE CYLINDER HYDRAULIC PRESS BRAKE

SUMMARY OF THE INVENTION

The present invention is directed to an electronic control system for operating the hydraulic cylinders associated with a press brake of the type having a fixeq bed supporting a V die. More particularly, the control system of the present invention permits independent control of each of the hydraulic cylinders to insure desired tracking and operation of the ram for more accurate forming of the workpiece.

In the type of conventional hydraulic press brake described in connection with the present invention, a hydraulically operated cylinder is mounted to each end of the ram member so as to vertically move the ram at a desired speed toward and away from the workpiece. Generally, it is desirable that the vertical position of each part of the ram be accurately known so that the forming punch positioned on the lower edge of the ram contacts the workpiece in a predictable manner to insure that the bend is initiated at the proper point. Likewise, accurate positioning of the ram and punch is also necessary to reverse the direction of travel of the ram at exactly the right point in order to terminate the bending of the workpiece to insure an accurate bend.

However, in some instances, it has been found that the hydraulic cylinders do not track each other exactly, so that one end of the ram is displaced vertically by a slight amount with respect to the other end. For example, it is quite common to establish the reversal point of the downward travel of the ram during the forming operation based upon the absolute vertical position of one or the other ends of the ram. Consequently, in a situation where the ram cylinders do not track each other exactly, one end of the ram and associated punch may be higher or lower than the other, resulting in an inaccurate reversal point. This can cause one end of the workpiece to be bent differently than the other end, resulting in errors in the bend geometry of the finished workpiece.

The present invention is directed to an electronic control system for individually controlling they track each other exactly, and therefore that the vertical position of all points on the ram can be accurately and predictably determined, particularly with regard to the reversal point of the ram.

In a first embodiment of the present invention, each of the hydraulic cylinders operating the ram is under control of an idealized digital reference. Each end of the ram is provided with a ram position encoder which produces a digital pulse for each increment of vertical ram travel in the form of a ram position control signal. Each of these ram position control signals is then compared with a digital reference signal which is proportional to the desired speed of the ram in a pulse comparison accumulator to produce an analogue error voltage. Each of the analogue error voltages is then summed with an analogue signal proportional to the desired speed ot the ram to produce a command signal. Each of the command signals is then used to increase or decrease the amount of hydraulic fluid supplied to the associated cylinder in order to exactly match the actual speed and position of that part of the ram to the desired ram speed and position.

As will become apparent from the detailed description which follows, this embodiment of the present invention is useful to insure that the ram remains absolutely horizontal as it moves downwardly toward the workpiece and during the forming operation. By matching the actual position of each end of the ram to a fixed known reference, the control system insures that the actual vertical positions of each end of the ram will be the same. Although for purposes of an exemplary showing, the control system of the present invention is described and illustrated in connection with a press brake having two hydraulic cylinders and associated pistons, it will be understood that the concept may be expanded to a ram, or rams, driven by any number of hydraulic cylinders.

In a second embodiment of the present invention, the speed of the ram is varied based on its actual position with respect to the workpiece in order to improve the material handling and the accuracy of bend. In the embodiment disclosed, the ram initially approaches the workpiece at a relatively high approach speed. When a predetermined distance from the workpiece is reached, the ram speed is decreased to a speed commensurate with the forming operation. During the forming operation, the actual reversal point of the ram is calculated, as well as an intermediate point corresponding to a ram position slightly ahead of the reversal point. When the ram reaches this calculated point, its speed is decreased further to a slow creep speed which continues until ram reversal. The creep speed may be a constant speed, or a decreasing, i.e. ramping, speed slower than the forming speed. Generally, the creep speed will be employed for only a short period ot time in order to eliminate overshoot of the ram so that reversal can occur at exactly the desired calculated point. Consequently, the ability of the control system of the present invention to accurately determine the actual vertical position of all parts of the ram insures that the transitions among the approach, forming and creep speeds occur at the proper points for greatest accuracy of bend.

In addition, in order to further improve the accuracy of the bend, the control system requires that all parts (e.g., both ends) of the ram reach the reversal point before the actual reversal command is given. Thus, in a situation where one end of the ram has reached the desired reversal point but the other end has not, the control system will hold the cylinder associated with the leading end of the ram at the reversal position until the other cylinder or cylinders have caused their associated parts of the ram to reach the desired reversal point, whereupon ram reversal can occur.

Finally, in a third embodiment of the invention, the control system is expanded to multiple cylinders on multiple press brakes. In this embodiment, each of the cylinders is controlled by the same digital reference source to insure that all cylinders track together. This embodiment of the invention is useful for bending very long members which may extend across several machines. Since the machines are synchronized together, slight inaccuracies caused by the transition from one machine to the next are thus eliminated.

Further features of the invention will become apparent from the detailed description which follows.

BRIEF DESCRIPTION OF THE DRAWING

FIG. 4 is a flow diagram illustrating the processing associated with a second embodiment of the present invention.

FIG. 5 is a graphical representation showing the ram speed/distance characteristics for the second embodiment of the present invention.

DETAILED DESCRIPTION

Figure 1:
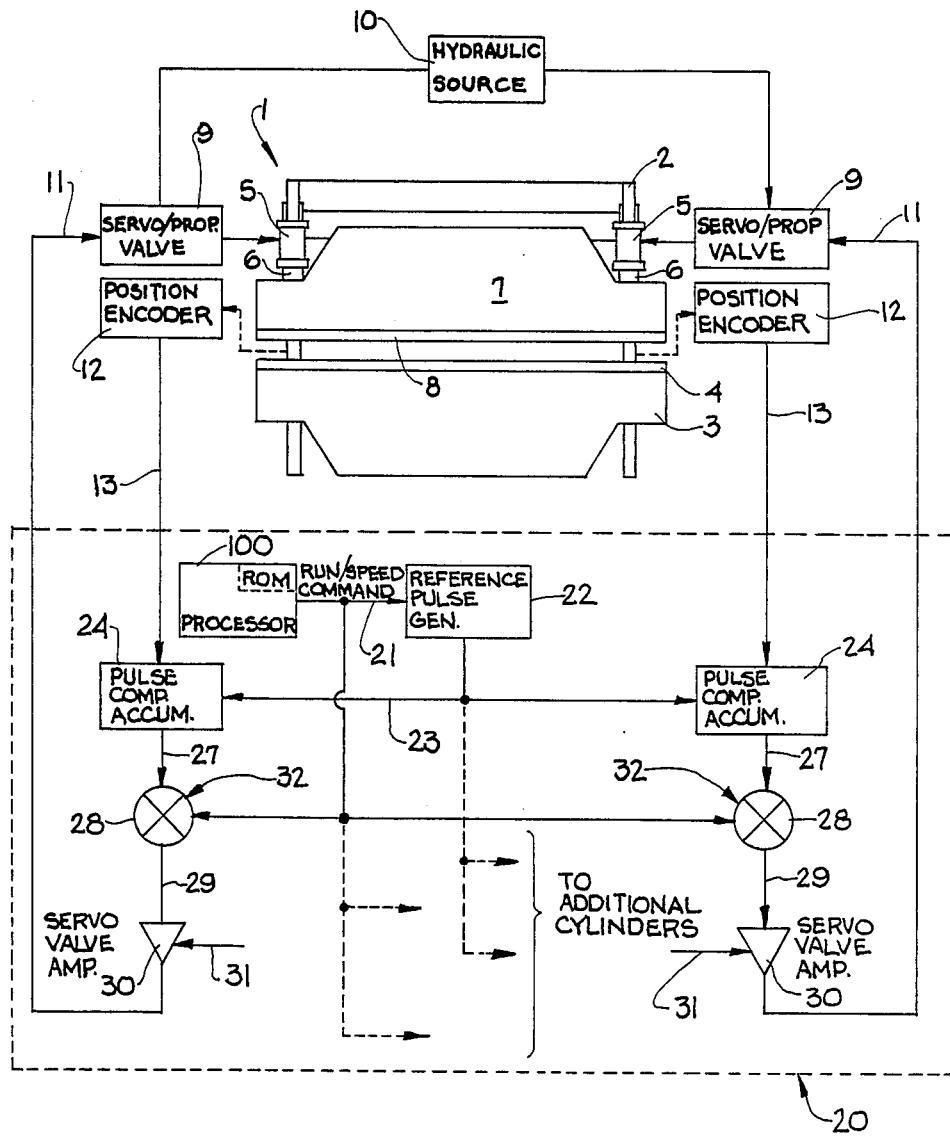
FIG. 1 is a schematic block diagram illustrating a first embodiment of the control system of the present invention.

FIG. 1 illustrates in block diagram form a first embodiment of the control system of the present invention for controlling a conventional two cylinder hydraulic press brake illustrated generally at 1. For purposes of an exemplary showing, the present invention is described and illustrated in connection with such a two cylinder press brake; however, it will be understood that the system may be used with suitable modifications with a press brake having any number of cylinders operating the press brake ram.

As is well known in the art, brake 1 includes a rigid structural frame 2 fixedly mounting a lower bed 3 which supports on its upper surface a horizontally oriented die 4 of suitable configuration for forming a workpiece (not shown) to a desired shape.

Frame 2 also mounts a pair of spaced vertically oriented hydraulically operated cylinders 5. Each of hydraulic cylinders 5 has associated therewith a vertically reciprocable piston 6, the lower end of which is fixedly attached to one end of ram member 7. The lowermost edge of ram member 7 mounts a horizontally oriented punch 8 configured to cooperate with die 4 to produce the desired bend geometry in a workpiece.

The flow of hydraulic fluid to and from each of cylinders 5 is controlled by means of a servo/proportional valve 9 from a source of hydraulic fluid 10 under control of an electrical control signal on line 11.

As is well known in the art, by application of an appropriate electrical control signal on line 11 to servo/proportional valve 9, hydraulic fluid may be caused to enter the upper end of cylinder 5, thereby moving piston 6 and the associated ram member 7 downwardly so that punch 8 engages the workpiece during the forming or bending stroke. After the bending operation has been completed, application of the appropriate electrical control signal on line 11 to servo/proportional valve 9 will cause hydraulic fluid to enter the lower end of cylinder 5, thereby moving ram member 7 upwardly so that punch 8 withdraws from the workpiece, thus completing the bending operation.

In order to ascertain the absolute vertical position of each end of ram 7, each end of ram 7 is provided with a conventional digital position encoder 12 which produces a digital pulse on output line 13 for each incremental distance traveled by the associated end of ram member 7. For example, a single digital pulse may be produced on output line 13 by position encoder 12 for each 0.0001 inch traversed by the associated end of ram member 7. Consequently, 10,000 such pulses will be produced for each inch of ram member travel.

A first embodiment of the control system of the present invention is shown generally at 20 in FIG. 1. It will be understood that the operation and construction of the part of control system 20 associated with the left-hand part of the circuit in FIG. 1 controlling the left end of ram 7 is identical with the operation and construction of that part of control system 20 associated with the right hand part of the circuit in FIG. 1 controlling the right end of ram 7. Control system 20 has as its input signals the position encoder outputs 13 previously described, and a run/speed command signal on line 21. In general, run/speed command signal 21 will be an analogue voltage having a magnitude proportional to the desired speed of downward travel of ram member 7. For example, a run/speed command signal of 0.2 volts may correspond to a ram member travel speed of 3.5 in/min, while a run/speed command signal of about 17.15 volts may correspond to a ram member travel speed of about 300 in/min. It will be understood, however, that other voltages corresponding to different ram travel speeds may be selected for a particular application. Furthermore, the run/speed command voltage, and hence the ram speed, need not be constant, but may be varied as will be described hereinafter. It will be further understood that the run/speed command signal may be produced by any suitable method, including via a processor 100 as described hereinbelow.

Run/speed command signal 21 is applied to reference pulse generator 22 which comprises a voltage-to-frequency converter producing digital reference position pulses on line 23 having a frequency proportional to the magnitude of the run/speed command voltage. For example, in the exemplary embodiment described wherein position encoders 12 produce 10,000 pulses per inch of ram member travel, reference pulse generator 22 will produce digital reference pulses on line 23 at the rate of about 583 pulses per second for a minimum ram speed of 3.5 in/min and at the rate of about 50,000 pulses per second for the maximum ram speed of 300 in/min. Any desired intermediate ram speed will produce digital reference pulses from reference pulse generator 22 having a correspondingly proportionate intermediate frequency.

The reference pulses on line 23 from reference pulse generator 22 are applied as one input signal to each of the pulse comparison accumulators 24. The other input to each of the pulse comparison accumulators 24 is formed by the position encoder output signal on line 13 from the associated position encoder 12.

The purpose of pulse comparison accumulators 24 is to produce an analogue error voltage having a magnitude proportional to the difference between the number of pulses produced by position encoder 12 and the number of pulses produced by reference pulse generator 22.

Figure 2:
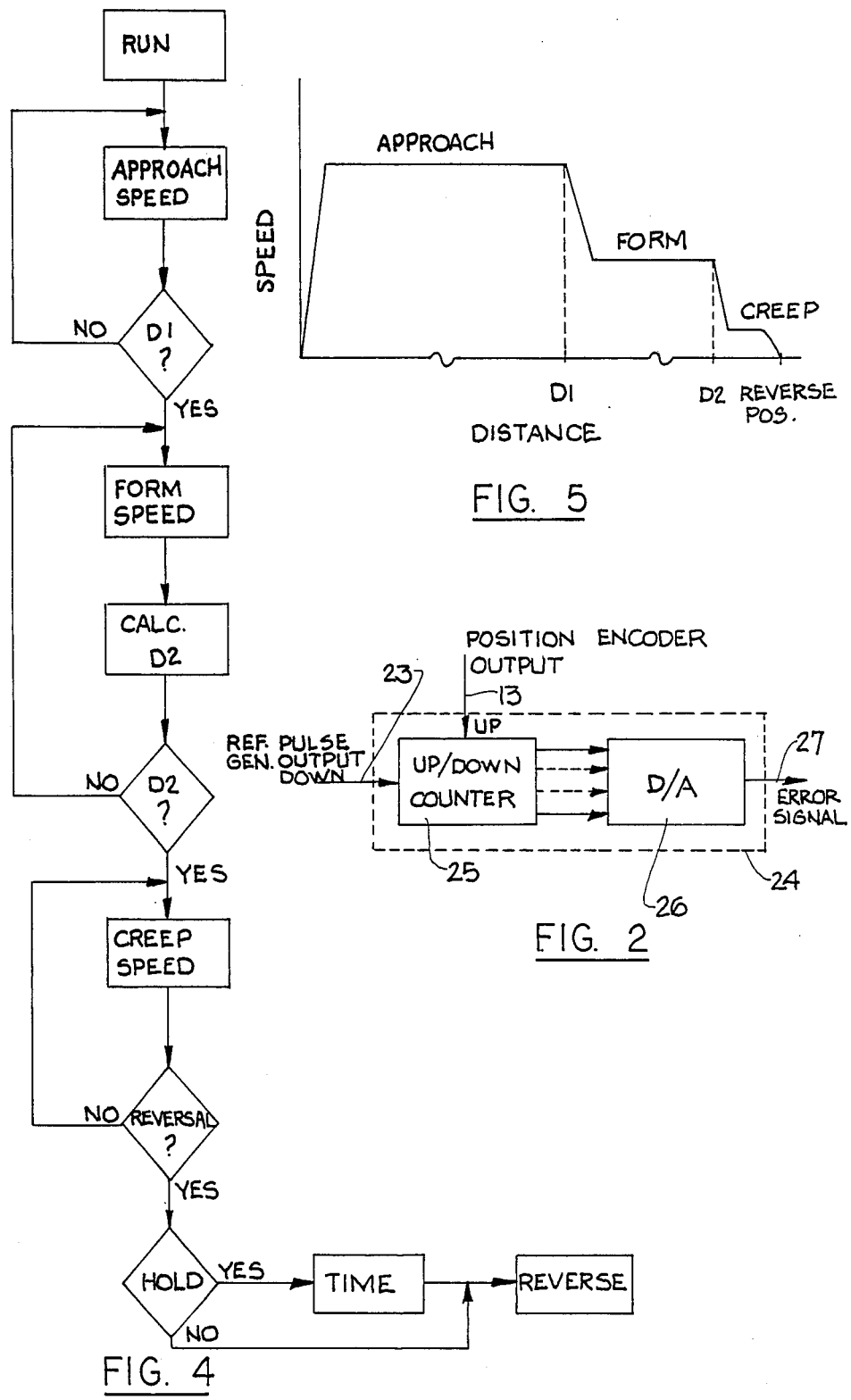
FIG. 2 is a block diagram showing the details of the pulse comparison accumulator associated with the control system of FIG. 1.

For example, as illustrated in FIG. 2, accumulator 24 may comprise a digital up/down counter 25, the outputs of which drive a digital to analogue (D/A) converter 26. The output produced by D/A converter 26 forms the analogue error signal previously described on line 27. As shown in FIG. 2, the position encoder output signal on line 13 is applied to the up count input terminal of counter 25, while the reference pulse generator output on line 23 is applied to the down count input of counter 25. Suitable clock synchronizing signals may be utilized as is well known in the art.

In operation, in the event that more pulses are produced by reference pulse generator 22 than are produced by position encoder 13, counter 25 will count down, and D/A converter 26 will produce an output error signal on line 27 having a magnitude and polarity so as to increase the speed of travel of the associated end of ram member 7. Conversely, if more pulses are produced by position encoder 12 than are produced by the reference pulse generator 22, counter 25 will count up, thereby causing D/A converter 26 to produce an error signal on line 27 so as to slow down the speed of travel of the associated end of ram member 7. It will be further observed that in the event an equal number of pulses is produced by both reference pulse generator 22 and position encoder 12, no error signal will be produced by accumulator 24 on line 27.

The analogue error signal from each accumulator 24 is applied as one input to it's associated summing amplifier 28. The other inputs to the summing amplifiers 28 is the analogue run/speed command signal on line 21. Hence, a signal will be produced on the output line 29 from summing amplifiers 28 corresponding to the sum of the error signal from accumulator 24 and the run/speed command signal.

As can be seen in FIG. 1, the output error voltage from summing amplifier 28 is applied through a suitable servo valve amplifier 30 to the servo/proportional valve 9 which controls the appropriate cylinder 5. Consequently, the control voltage (Vcont) applied on line 11 to each of the servo valves may be expressed by the equation:

$$V_{cont} = V_{r/s} + \Delta V$$

where
Vcont = control voltage applied to servo/proportional valve 9
$V_{r/s}$ = run/speed command voltage on line 21
$\Delta V$ = error voltage produced by pulse comparison accumulator 24

For example, assume that the desired speed of the ram member 7 is 150 in/min, which corresponds to a run/speed command voltage of about 8.5 volts. If both ends of the ram member were moving at exactly this desired speed, no error would be produced by either of the pulse comparison accumulators, so that the output from summing amplifiers 28 would be the full 8.5 volts. This voltage, in turn, is applied to servo/proportional valve 9 in order to cause the proper amount of hydraulic fluid to enter the cylinders 5 from source 10 so as to drive the pistons 6 and connected ram 7 downwardly at the desired rate.

However, in the event that either end of the ram is moving more slowly than desired, an error signal $\Delta V$ (corresponding to a positive voltage) will be produced by pulse comparison accumulator 24 and added by summing amplifier 28 to the run/speed command signal. That is, reference pulse generator 22 will have produced more pulses than position encoders 12. This difference will be converted by pulse accumulator 24 to a positive error voltage $\Delta V$ which is added by summing amplifier 8 to run/speed command signal 21. This increased voltage will then be applied to servo/proportional valve 9 in order to provide more hydraulic fluid flow to the associated cylinder 5 in order to increase the downward speed of travel of the lagging end of ram 7.

Conversely, if either end of ram 7 is moving more rapidly than desired, more pulses will be produced by the associated position encoder 12 than by reference pulse generator to produce a negative error voltage which will be added by summing amplifier 28 to the run/speed command signal, to reduce the value of the run/speed command voltage. This reduced voltage (Vcont) is then applied on line 11 to the associated servo/proportional valve 9 in order to reduce the amount of hydraulic fluid supplied to the associated cylinder 5, thereby reducing the downward speed of travel of the leading end of ram 7.

Figure 3:
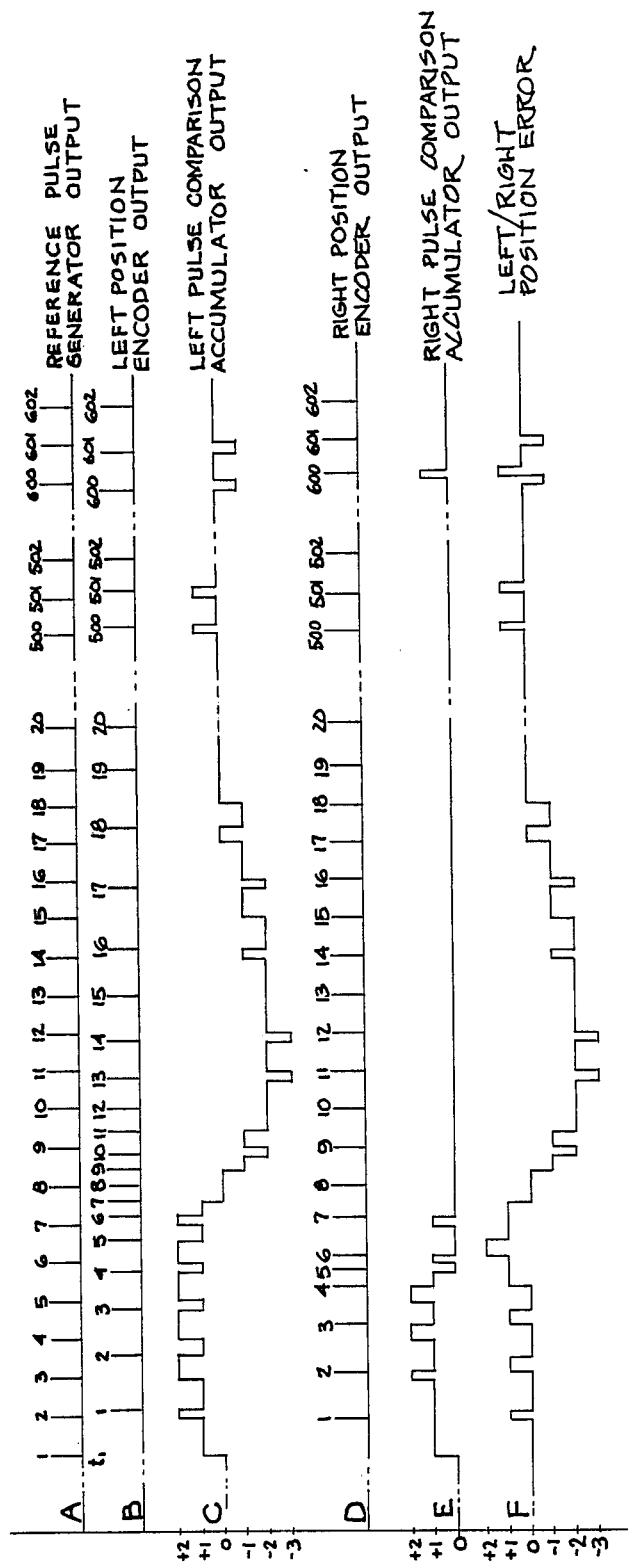
FIG. 3 is a representative timing diagram showing the relationship of digital signals within the control system of fig. 1.

A representative timing diagram for the operation of control system 20 is illustrated in FIG. 3. Trace A shows the output from reference pulse generator 22 produced when the run/speed command signal on line 21 is initiated at the time designated $t_1$. In the specific example illustrated in FIG. 3, it is assumed that the downward speed of ram member 7 is to remain constant, so that the magnitude of the run/speed command voltage and hence the frequency of the reference pulses on line 23 are constant. However, the operation to be described will be similar if the magnitude of the run/speed command signal is varied during operation of the ram. This may be advantageous, for example, where it is desired for the ram to approach the workpiece at a relatively high speed, but perform the bending operation at a slower speed.

Trace B in FIG. 3 illustrates the output pulses produced by the left position encoder 12 following initialization of the run/speed command signal at time $t_1$.

Similarly, trace C illustrates the error signal produced by the pulse comparison accumulator 24 associated with the left position encoder 12. It will be observed that under the conditions illustrated, the leftmost end of ram member 7 is moving somewhat more slowly than the desired ram speed. Consequently, more pulses are being produced by reference pulse generator 22 than are being produced by left position encoder 12. This produces a positive output error voltage from the left pulse comparison accumulator 24.

It will also be observed that because of the particular system dynamics associated with the feedback control system 20 and press brake 1, the leftmost end of ram member 7 begins moving somewhat faster than the desired speed between the 8th and 9th output pulse produced by reference pulse generator 22. This condition continues until the system stabilizes following the 18th reference pulse. From that point, the same number of position encoder pulses and reference pulses continue to be produced, resulting in zero error voltage produced by the left pulse comparison accumulator. Consequently, the leftmost end of ram number 7 is precisely positioned and is moving at exactly the desired speed.

It will be observed that once steady state conditions have been established, the maximum error between the number of pulses produced by reference pulse generator 22 and left position encoder 12 will be ±1 pulse. For example, during the sequence of pulses numbered 500–502 produced by the reference pulse generator, the left end of the ram member is moving slightly more slowly than desired, thus producing an instantaneous error of +1 pulse from the left pulse comparison accumulator. Similarly, during the pulse sequence 600–602, the left end of the ram member is moving slightly more rapidly than desired, thus producing an error of −1 pulse. Because of the feedback to servo/proportional valve 9, however, the situation is quickly corrected so that the number of pulses produced by left position encoder 12 exactly matches the number of pulses produced by reference pulse generator 22.

Similarly, trace D in FIG. 3 shows a representative output from the right position encoder 12, and the resulting output from the right pulse comparison accumulator 24. In the example given, it can be observed that initially the rightmost end of ram 7 is moving slightly more slowly than desired, resulting in a positive error voltage. However, following pulse number 7 from reference pulse generator 22, the right end of ram 7 attains the proper speed, producing zero error voltage.

Finally, trace F in FIG. 3 shows the actual position error between the left and right ends of ram 7 for the representative example given. In this case, the left end of the ram is moving slightly more slowly than the right end, so that the left end is slightly higher than the right end. Following reference pulse generator output pulse number 7, however, the left end of the ram is moving slightly more rapidly than desired, and is positioned slightly below the right end. Following the steady-state conditions after reference pulse number 18, each end of the ram is synchronized exactly to the reference pulse generator, so that both ends of the ram are at exactly the same position and are moving at exactly the desired speed. It will be observed that under steady-state conditions, the vertical positions of the ends of the ram can differ from each other by no more than ±2 pulses, corresponding to an absolute vertical position difference of about 0.0002 inches.

As illustrated in FIG. 1, additional feedback signals may be provided to servo amplifiers 30 on lines 31 as is well known in the art. In addition, more than two cylinders and pistons may be utilized to move the ram member 7 utilizing additional position encoders, pulse comparison accumulators, summing amplifiers, servo valve amplifiers and servo valves by utilizing a common run/speed command signal and reference pulse generator output signal as shown.

Furthermore, it will be understood that in the example described hereinabove, it was desired to maintain opposite ends of ram number 7 at the same vertical position. In some applications, it may be desirable to maintain a fixed vertical distance between the ends of the ram member in order to compensate for misalignment between the ram member and die, or for other reasons. This may be easily accomplished by merely adding a fixed offset voltage 32 of the appropriate magnitude and polarity to summing amplifiers 28, or by changing the relative offset of the D/A converter 26 associated with pulse comparison accumulator 24.

It will further be observed that if it is desired to hold a particular position, the run/speed command signal 21 can be zero and the reference pulse generator 22 output terminated or clamped.

A second embodiment of the present invention is illustrated in FIG. 4 and FIG. 5, where elements similar to those previously described are similarly designated.

As indicated previously, this embodiment of the control system of the present invention automatically varies the magnitude of the run/speed command signal on line 21 so as to change the speed of ram 7 as it moves downwardly before and during the forming of the workpiece.

The particular desired speed characteristic of the ram as a function of its vertical distance is illustrated graphically in FIG. 5. Initially, it is desired that the ram approach the workpiece at a relatively high APPROACH speed. Shortly before contact of the punch 8 with the workpiece (at a ram distance $D_1$ it is desired to reduce the speed of the ram to a slower FORM speed in order to increase the tonnage which can be applied to the workpiece during the bending operation. Shortly before the ram reversal point is reached at the end of the bending stroke, it is desired to decrease the speed of the ram still further (CREEP speed) in order to insure that the ram reverses at exactly the roper point with no overshoot. Generally, the time duration that the ram is actually moving at the CREEP speed will be short, in order to minimize the cycle time of the press brake.

A run/speed command signal causing the desired noted speed/distance ram travel characteristics may be produced by a processor 100 as illustrated in FIG. 1, such as a microprocessor operating under the program represented by the flow diagram illustrated in FIG. 4. It will be understood that the program represented by this flow diagram may be incorporated as firmware in a ROM associated with processor 100 as is well known in the art.

As illustrated in FIG. 4, following the RUN command initiated by the operator, processor 100 produces a run/speed command signal corresponding to the relatively high PPROACH speed of ram 7. This condition continues until the ram reaches the vertical position $D_1$, whereupon a run/speed command signal corresponding to the slower FORM speed is produced. The vertical distance $D_1$ may be established by the operator based upon the particular die and punch characteristics and the material to be formed. Generally, it is desirable that the distance $D_1$ be established at a point before the punch contacts the workpiece. In addition, the processing associated with processor 100 may determine the actual vertical position of ram 7 by information derived from either or both of position encoders 12 or reference pulse generator 22.

During the forming of the workpiece, processor 100 also calculates the reversal point at which the ram 7 is to change direction and begin upward movement. This reversal point may be established as a fixed vertical distance based on the geometry and springback characteristics of the work piece, or by using an adaptive method such as those described in U.S. Pat. No. 4,408,471 or in pending U.S. application Ser. No. 06/911,915 entitled "Adaptive Control System For Hydraulic Press Brake" filed Sept. 17, 1986 and assigned to the same assignee as the present invention.

The vertical position $D_2$ may be established shortly before the desired reversal point is reached. Generally, it is desirable to keep the distance between position $D_2$ and the reversal point relatively short in order to reduce the overall cycle time of the press brake, while at the same time eliminating ram overshoot to the greatest extent possible. As shown in FIG. 4, ram 7 continues moving at the FORM speed until the position $D_2$ is reached. At this point, processor 100 causes a change in the run/speed command so as to move the ram at the slower CREEP speed. It will be understood that the CREEP speed may be a constant value, or may ramp downwardly, i.e. decrease, from the FORM speed.

This condition continues until all parts of the ram have reached the reversal point as determined by the outputs from position encoders 12. In the event that one end of the ram has not yet reached the reversal point, the cylinder associated with the end which has reached the reversal point is held at that position until the other end of the ram reaches the reversal point. At that time, the reversal command to both cylinders can be given to begin moving the ram in the upward direction. Thus, by independently controlling the cylinders operating the ram, accurate establishment of the actual reversal point of the ram can be achieved.

In the embodiment just described, it will be understood that the run/speed command may be produced by processor 100 as an analogue signal for producing reference pulses via reference pulse generator 22. Alternately, processor 100 may be programmed using a program following the processing of FIG. 4 to produce the digital reference pulses directly, with the run/speed command signal being produced by digital/analogue conversion of the digital reference pulses so produced. As another alternative, the reference signal can be generated via software as part of the internal processing of the processor, utilizing the encoder signals as a direct input to the processor, and conditioning the processor output through suitable D/A conversion as an input directly to the servo valve.

Figure 6:
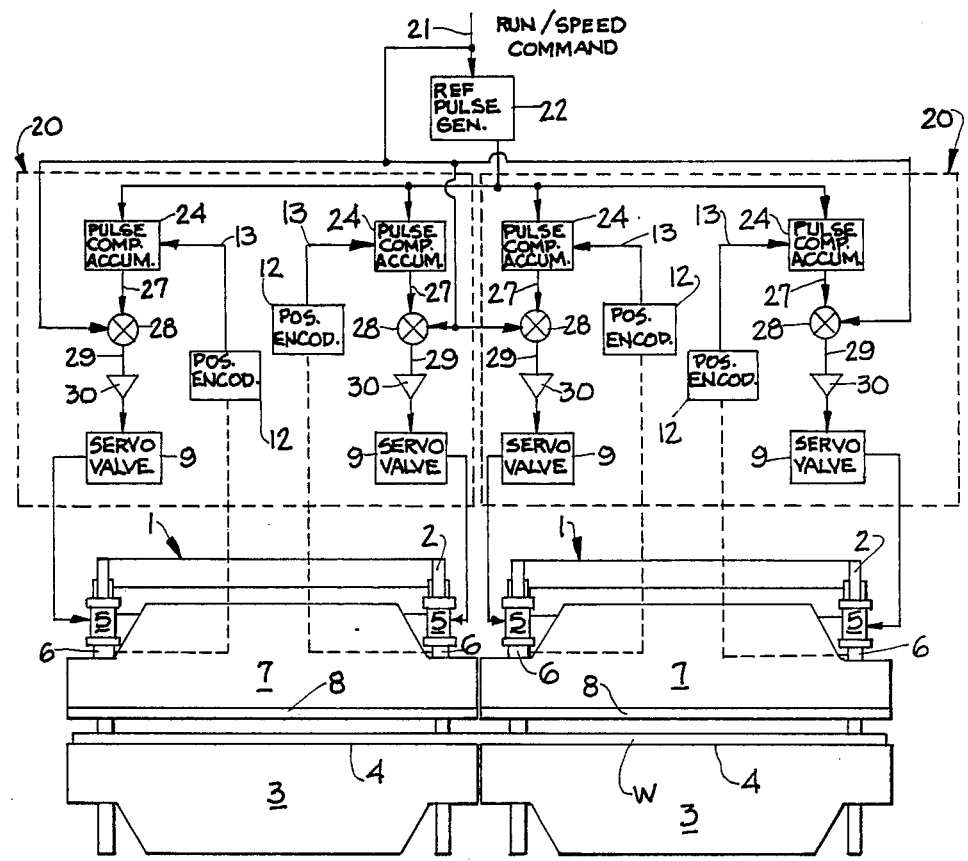
FIG. 6 is a schematic block diagram illustrating a third embodiment of the control system of the present invention utilizing multiple press brakes.

A third embodiment of the present invention is illustrated in FIG. 6 in connection with multiple press brakes. This embodiment has particular utility for bending a very long workpiece which cannot be formed by a single brake and therefore is positioned so as to extend across several machines.

As illustrated in FIG. 6, where elements similar to those previously described have been similarly designated, there are provided two press brakes 1 positioned in side-by-side relationship so that rams 7 are substantially coextensive, but are not connected together mechanically. A single elongated work piece W is positioned so as to lie across both dies 4. As noted above, it is desired to bend work piece W (for example at a 45° angle) simultaneously with both press brakes free of any inaccuracies caused by the transition from one press brake to the next.

Each press brake 1 is supplied with a control system 20 similar to that previously described. Each of control systems 20 operates to control the hydraulic cylinders associated with one of the press brakes 1. In addition, there is but a single run/speed command on line 21 and associated reference pulse generator 22 which supplies reference pulses to both control systems 20. Thus, both press brakes are operated in response to reference pulses from a single reference pulse generator source.

The operation of each of the press brakes similar to that described hereinabove. In addition, inasmuch as all cylinders are driven from a common reference source, each of the rams 7 will accurately track the other so that the net effect is equivalent to a single ram, rather than two mechanically disjointed rams. In addition, all of the modifications to the control system previously described, including the embodiment described in connection with FIG. 4 and FIG. 5, may be employed in connection with the embodiment of FIG. 6.

It will be understood that the embodiment of FIG. 6 may be expanded to any number of press brakes simultaneously operating to form the same workpiece. In addition, the inventive principles of the embodiment of FIG. 6 may also be applied to a plurality of separate press brakes simultaneously forming different workpieces, such brakes even being located remote from each other, but still under control of a single reference pulse generator source.

It will be understood that changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. In a press brake having a bed supporting a forming die, a vertically movable ram mounting a punch for cooperating with the die to bend a workpiece positioned on said die, at least two pistons connected to said ram at horizontally spaced locations, a hydraulically operated cylinder associated with each of said pistons for vertically moving said ram, and flow control means associated with each of said cylinders and responsive to an electrical command signal for its respective cylinder to control the flow of hydraulic fluid to and from its respective cylinder, the improvement comprising a ram position encoder is association with each of said cylinders each producing a digital pulse for each increment of vertical ram travel in the form of a ram position signal, control means for generating said command signal for each of said flow control means, said control means including programmed means for generating an electrical speed signal representative of the desired speed of the ram, said control means including means to produce a digital reference signal proportional to the desired speed of said ram, and means to compare said ram position signals to said digital reference signal and to produce an error signal for each flow control means, and means to sum each error signal with said speed signal to produce said command signal for each of said flow control means whereby to control the speed of said ram and to control the vertical position of all parts of said ram during vertical movement thereof at least just before and during ram reversal.

2. The apparatus according to claim 1 including means for establishing the vertical ram position at which ram reversal is to occur, and means for reversing the direction of travel of the ram only when all parts of the ram have reached said reversal position, 3. The apparatus according to claim 2 wherein said reversal means inlcudes means for maintaining one of the cylinders at the reversal position until all cylinders have reached the reversal position and thereafter reversing direction of the ram.

4. The apparatus according to claim 1 wherein said comparison means comprises means to count the number of position signal pulses from each encoder and to count the reference signal pulses, each of said error signals representing the difference between the counted reference signal pulses and position signal pulses from its respective position encoder.

5. The apparatus according to claim 4 wherein said comparison means is operative to decrease the flow of hydraulic fluid to or from any one of said cylinders if the number of position signal pulses counted from the encoder associated with that cylinder exceeds the number of reference signal pulses counted and to increase the flow of hydraulic fluid to or from said same cylinder if the number of reference signal pulses counted exceeds the number of position signal pulses counted from said encoder associated with that cylinder.

6. The apparatus according to claim 5 including means for establishing a fixed vertical position offset between said parts of the ram.

7. The apparatus according to claim 5 wherein said parts are substantially the outermost ends of the ram, respectively.

8. The apparatus according to claim 5 wherein said means to generate an electrical speed signal includes program means for moving said ram at a plurality of predetermined speeds.

9. The apparatus according to claim 8 wherein said program means includes means for moving the ram at a reduced speed so as to minimize ram overshoot during ram travel immediately preceding ram reversal.

10. The apparatus according to claim 8 wherein said program means includes means for moving the ram at a downward approach speed prior to contact of the punch with the workpiece, at a second slower downward forming speed during bending of the workpiece, and at a third still slower downward creep speed during bending of the workpiece and immediately preceding ram reversal, said creep speed being chosen so as to minimize ram overshoot.

11. The apparatus according to claim 10 including means for calculating the vertical ram position at which said creep speed is to commence.

12. The apparatus according to claim 10 including means for calculating the vertical ram position at which ram reversal is to occur and means for calculating from said reversal position the ram position at which said creep speed is to commence.

13. The apparatus according to claim 1 including at least one additional press brake having a bed supporting a forming die, a vertically movable ram mounting a punch for cooperating with the die to bend a workpiece positioned on the die, a plurality of piston members connected to said ram at horizontally spaced locations, a hydraulically operated cylinder associated with each of said pistons for vertically moving the ram, flow control means associated with each of said cylinders of said at least one additional press brake and responsive to an electrical command signal for its respective cylinder to control the flow of hydraulic fluid to and from its respective cylinder, and a ram position encoder in association with each of said cylinders of said at least one additional press brake, each position encoder producing a digital pulse for each increment of vertical travel of said ram of said at least one additional press brake in the form of a ram position signal, said control means generating a command signal for each of said flow control means of said press brakes, said electrical speed signal being representative of the desired speed of the rams of said press brakes, means to compare said ram position signals of said at least one additional press brake to said digital reference signal and to produce an error signal for each flow control means of said at least one additional press brake, and means to sum each error signal for said flow control means of said at least one additional press brake with said speed signal to produce said command signal for each of said flow control means of said at least one additional press brake whereby to control and synchronize the speed and the vertical position of all parts of said rams of said press brakes simultaneously.

14. The apparatus according to claim 13 wherein said comparison means comprises means to count the number of position signal pulses from each encoder and to count the reference signal pulses, each of said error signals representing the difference between the counted reference signal pulses and position signal pulses from its respective position encoder.

15. The apparatus according to claim 14 wherein said comparison means is operative to decrease the flow of hydraulic fluid to or from any one of said cylinders if the number of position signal pulses counted from the encoder associated with that cylinder exceeds the number of reference signal pulses counted and to increase the flow of hydraulic fluid to or from said same cylinder if the number of reference signal pulses counted exceeds the number of position signal pulses counted from said encoder associated with that cylinder.

16. The apparatus according to claim 13 wherein said means to generate an electrical speed signal includes program means for moving said rams at a plurality of predetermined speeds.

17. The apparatus according to claim 16 wherein said program means includes means for moving the rams at a reduced speed so as to miimize ram overshoot during ram travel immediately preceding ram reversal.

18. The apparatus according to claim 16 wherein said program means includes means for moving the rams at a downward approach speed prior to contact of the punches with the workpiece, at a second slower downward forming speed during bending of the workpiece, and at a third still slower downward creep speed during bending of the workpiece and immediately preceding ram reversal, said creep speed being chosen so as to minimize ram overshoot.

19. The apparatus according to claim 13 wherein said press brakes are positioned in closely spaced side-by-side relationship so that said rams are operative to simultaneously bend a single elongated workpiece positioned on the dies of the brakes.

20. The apparatus according to claim 15 wherein said parts are substantially the outermost ends of the rams, respectively.

21. The apparatus according to claim 20 including means for establishing a fixed vertical position offset between said parts of each of said rams.

22. The apparatus according to claim 18 including means for calculating the vertical ram position at which ram reversal is to occur and means for calculating from said reversal position the ram position at which said creep speed is to commence.

* * * * *